Sept. 8, 1970  N. G. KLING  3,527,257
PLUNGER TYPE SOLENOID VALVE
Filed Aug. 24, 1967

INVENTOR.
NELSON G. KLING
BY
ATTORNEY

3,527,257
PLUNGER TYPE SOLENOID VALVE
Nelson G. Kling, Ringwood, N.J., assignor to Technicon Corporation, Ardsley, N.Y., a corporation of New York
Filed Aug. 24, 1967, Ser. No. 663,025
Int. Cl. F16k 11/07, 31/06
U.S. Cl. 137—625.65                         1 Claim

ABSTRACT OF THE DISCLOSURE

A valve has a valve body with a central longitudinal bore, a radial bore opening thereon, stationary O-ring fitted into a recess within the wall of the central bore on each side of said radial port, and a plunger member disposed within said bore and said stationary O-rings and reciprocable therein. An additional bore opens into said central bore on each side of the radial bore-two O-ring assembly. The plunger has a reduced portion to alternatively couple the central bore to one of the two additional bores, while at that time the plunger in conjunction with an O-ring seals the other of the two additional bores. The body and plunger are made of inert material, one softer than the other.

BACKGROUND OF THE INVENTION

Field of the invention

This invention relates to valves for liquids and for gas, and particularly to valves having a push-pull movement of the slide or plunger.

The prior art

One use of this invention is the provision of a valve which is particularly adapted for use in an automatic quantitative analysis apparatus incorporating a chromatography column as shown, for example, in U.S. Pat. No. 3,166,929 or U.S. Pat. No. 3,220,246. In such apparatuses, flowing stream of fluid are advanced through relatively small conduits having an internal diameter in the order of .005 inch to .110 inch, at a delivery rate of .015 cc./min. to 3.90 cc./min. These streams may include corrosive liquids, and may have to be switched from one conduit to another conduit without gross distortion of the stream, and in phase with the switching of other streams, and, therefore, the valve must have a relatively small internal volume, be chemically inert, easily actuated by hand, and inexpensive.

Commonly, when a stream from one conduit must be switched to either of two other conduits, a rotary valve actuated by a rotary solenoid is utilized. The internal passageway of the valve stream is customarily formed with a curved longitudinal axis so that the passageway can alternatively interconnect one port with either of two other ports, and can have a circular cross section at the interface between the passageway and these ports. Such a passageway cannot be machined through a solid stem and must be moulded therein.

Further, these rotary valves have large surfaces in sliding engagement with each other, and any slight leakage tends to avalanche, as salt deposited between these faces increases the spacing therebetween and, thereby, the leakage rate.

Accordingly, it is an object of this invention to provide a valve having two outlets, which is leakproof, corrosion resistant, and has internal cavities of minimal size.

BRIEF SUMMARY OF THE INVENTION

The principle of the invention lies in a valve having a body with a central bore and a plunger reciprocable therein to and between two positions. The plunger has two spaced apart enlargements which cooperate respectively, but alternatively, with two annular sealing members in the central body to control the flow of liquid from an inlet port opening into the bore between said sealing members, and two outlet ports opening from the bore respectively on the far side of each of said sealing members.

BRIEF DESCRIPTION OF THE DRAWING

These and other objects, features and advantages of this invention will be apparent from the following specification thereof, taken in conjunction with the accompanying drawing in which.

DESCRIPTION OF THE PREFERRED EMBODIMENT

Figure 1:
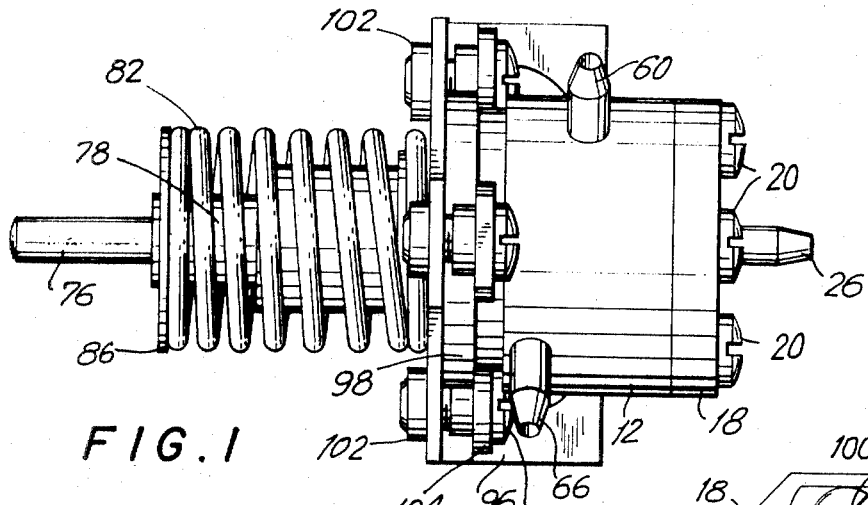
FIG. 1 is a top view in plan of a valve embodying this invention.
Figure 2:
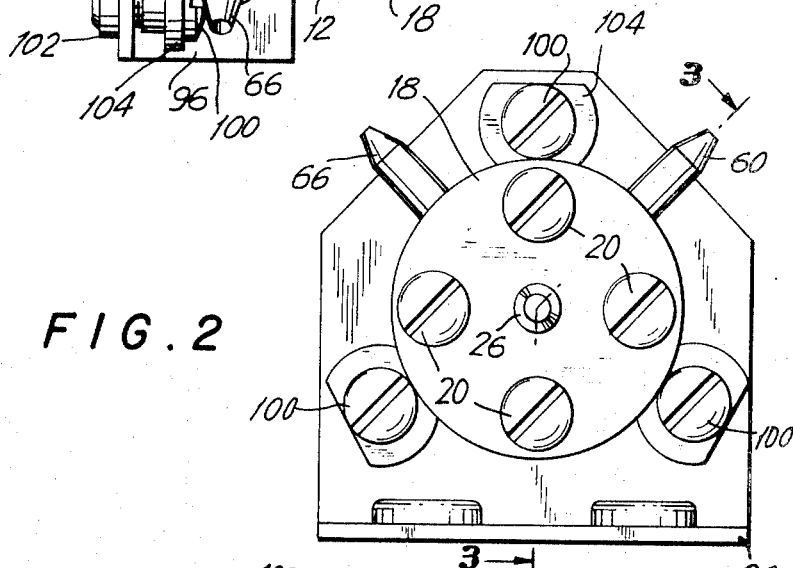
FIG. 2 is an end view in elevation of the valve of FIG. 1.

The valve body comprises a main body 12, an end fitting 14, an insert 16, and a cap 18. Four machine screws 20 pass through bores in the cap, and the body and into threaded bores in the fitting to fix these parts together, and to capture the insert between the body and the end fitting. These four parts are coaxial, and together provide a central bore in which a plunger 24 reciprocates. The cap 18 has a central extension on one face which serves as a nipple 26, and a central extension on the other face which serves as a socket 28 to receive the head 30 of the plunger 24. The main body 12 has a first counterbore 32 which receives this socket 28 of the cap, and a second counterbore 34 to receive an O-ring 36 which serves to seal the bore at the interface of the body and the cap. The socket 28 does not project into the entire depth of the counterbore 32, and thus provides an annular groove 38 which receives an O-ring 40. The main body 12 has a third counterbore 42 to receive one end of the insert 16. The insert does not project into the entire depth of the counterbore 42, and thus provides an annular groove 44 which receives an O-ring 46.

The end fitting 14 has a first counterbore 48 which receives the other end of the insert, and a second counterbore 50 to receive an O-ring 52 which serves to seal the bore at the interface of the body and the end fitting. Said other end of the insert does not project into the entire depth of the counterbore 48 and thus provides an annular groove 54 which receives an O-ring 56.

The main body 12 has a first radial bore 58 opening into the central bore between the O-ring 40 and 46. This radial bore 58 is counterbored to receive a nipple 60. The end portion of the insert 16 adjacent the O-ring 46 is reduced in external diameter and has four radial bores 62 therethrough. The main body 12 has a second radial bore 64, substantially adjacent the plane of the radial bores 62, which is counterbored to receive a nipple 66.

The plunger 24 is necked down at 68 to separate the head portion 30 from the main portion 70 of the plunger. The head portion is somewhat smaller in diameter than the socket 28. When the head portion is disposed within and sealed to the O-ring 40, the necked portion 68 lies within and clears O-ring 46 and the radial bores 62. When the head is disposed further within the socket 28 to clear the O-ring 40, the main portion 70 is disposed within and sealed to the O-ring 62.

Figure 3:
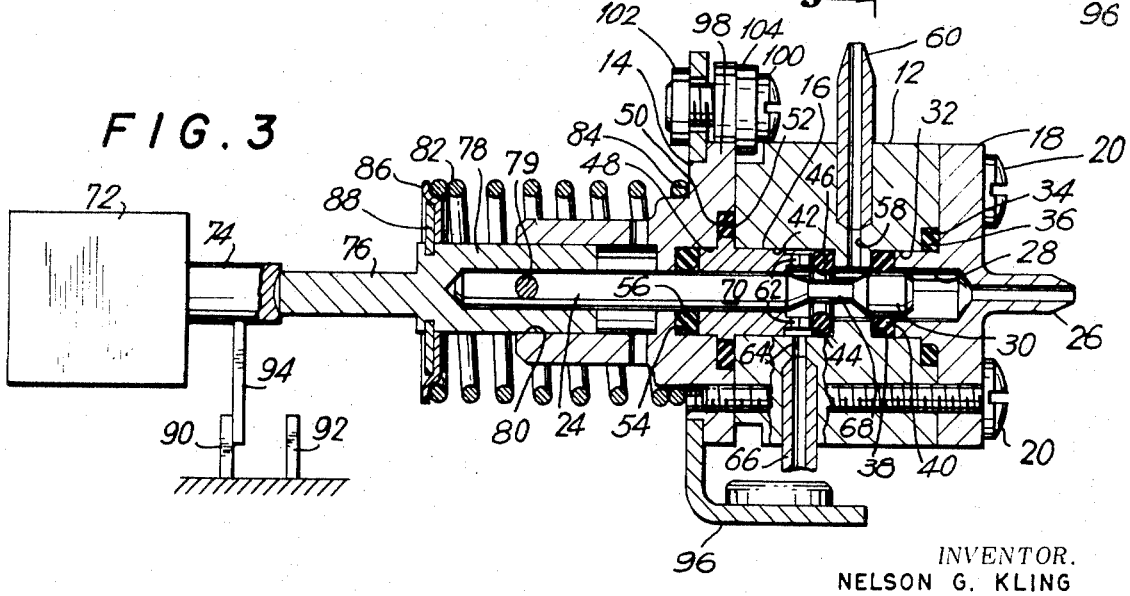
FIG. 3 is a side view in elevation, in cross section taken along the plane 3—3 of FIG. 2, with certain parts rotated out of the plane for clarity of illustration.

Thus when the plunger is in the normal, left-hand position shown in FIG. 3, fluid can flow in through the nipple 60 into the central bore, past the necked portion 68, through the radial bores 62, and out the radial bore 64 and the nipple 66. The flow of fluid towards the nipple 26 is blocked by the seal provided by the O-ring 40 between the central bore and the head portion 30 of the plunger. When the plunger is in the right hand position, with the head portion 30 further right in the socket portion 28, then fluid can flow in through the nipple 60, into the central bore, past the necked portion 68 and the head portion 30, and out the nipple 26. The flow of fluid towards the nipple 66 is blocked by the seal provided by the O-ring 46 between the body portion of the plunger and the central bore. It will be noted that the necked portion has a cone shaped transition with the head and body portions of the plunger, whereby movement of the plunger with respect to and into compressive engagement with the O-rings 40 and 46 is facilitated.

Movement of the plunger 24 is controlled by a push type solenoid 72 having a core 74 which moves to the right as seen in FIG. 3, when energized. The core 74 bears against a plunger extension 76 which has a right socket portion 78 which receives the left end of the body portion of the plunger, and is pinned at 79 thereto. The socket portion 78 of the plunger extension is disposed in a counterbored portion 80 of the central bore in the end fitting. A compression spring 82 is disposed over the plunger extension and is captured between an annular step 84 on the end fitting and an annular spring retainer 86 held on the extension by a C-clip 88 disposed in an external groove on the plunger extension. Thus, the spring serves to bias the plunger to the left. External movement stops 90 and 92 are provided to cooperate with an extension 94 fixed to the core 74 to limit left and right reciprocation of the solenoid core. A bracket 96 is releasably secured to an annular plunger 98 of the fitting 14 by three sets of bolts 100, nuts 102, and dog-washers 104; and may have a bent over extending portion of any desired configuration to permit the convenient mounting of the valve.

I have found it advantageous to make the plunger and the valve body parts of inert, generally nonwetting materials, with a slight difference in hardness between the plunger and the valve body parts. Thus I form the plunger of a fluorinated hydrocarbon plastic such as "Teflon" sold by the Du Pont de Nemours & Co., Inc. and the valve body parts of a relatively harder fluorinated hydrocarbon plastic such as "Kel-F" sold by the Minnesota Mining and Manufacturing Corporation.

The O-rings are made of a suitable elastomer such as a fluoro-carbon rubber sold as "Viton" by the Du Pont de Nemours & Co., Inc.

It must be noted that the piston-like action of the plunger between the two outlet nipples precludes the entrance of ambient atmosphere into the valve. The use of fluorinated hydrocarbon material in the piston for movement in and compression of the rubber O-ring provides nominal friction. The use of stationary O-rings in recesses into which the O-rings can be distorted under compression minimizes the wear of these O-rings.

The valve described and illustrated herein is also especially well adapted to be utilized in the system described and illustrated in my copending U.S. Pat. application Ser. No. 585,088, filed Oct. 7, 1966, by replacing the three-way valve shown therein.

While I have shown and described the preferred embodiment of the invention, it will be understood that the invention may be embodied otherwise than as herein specifically illustrated or described, and that certain changes in the form and arrangement of parts and in the specific manner of practicing the invention may be made without departing from the underlying idea or principles of this invention within the scope of the appended claim.

What is claimed is:
1. A valve comprising:
a body member formed of a first fluorinated hydrocarbon material and having a central longitudinal bore therein;
a plunger member formed of a second fluorinated hydrocarbon material, said plunger member being disposed within said central longitudinal bore and longitudinally reciprocable to and between two positions therein, said first material being relatively harder than said second material;
said body member further including an input bore opening into said central longitudinal bore and into which fluid is directed, two annular recesses formed into said central longitudinal bore, one on each side of the opening of said input bore, and two annular resilient members, each disposed in one of said annular recesses, respectively, a first output bore including nipple means opening into said central longitudinal bore on one side of one of said resilient members remote from said input bore, a second output bore including nipple means opening into said central longitudinal bore on the other side of the other of said resilient members remote from said input bore, said second output bore being coaxial with said central longitudinal chamber and that portion of said central longitudinal chamber intermediate said second output bore and the corresponding resilient member has a diameter substantially greater than the diameter of that portion of said plunger member reciprocated therein, so as to allow free flow of fluid between said input bore and said second bore between opposing surfaces of said plunger member and said longitudinal chamber;
said plunger member having a portion of reduced diameter and of a longitudinal extent adequate to overlie said input bore and one, but not both, of said resilient members;
said plunger member, when disposed in the first of said two positions, adapted to provide, by means of said reduced portion, a fluid coupling between said input bore and said first output bore while being disposed through and in a sealed relationship with the resilient member on the other side of said input bore and thereby blocking flow of fluid to said second output bore opening, and when disposed in the second of said two positions, adapted to provide, by means of said reduced portion, a fluid coupling between said input bore and said second output bore while being disposed through and in a sealed relationship with the resilient member on the other side of said input bore and thereby blocking flow of fluid to said first output bore;
spring means for maintaining said plunger member in one of said two positions;
solenoid means connected to said plunger member for disposing said plunger member in said other of said two positions; and means for limiting the movement of said plunger means in said central longitudinal bore so as to be positioned in said first position or said second position, said limting means beng operative to space the end of said plunger member from said second output bore when disposed in said second position.

References Cited

UNITED STATES PATENTS

| Re. 25,251 | 10/1962 | Ovail | 137—625.69 XR |
| 2,661,182 | 12/1953 | Kipp | 137—625.69 XR |
| 2,702,049 | 2/1955 | Seeloff | 137—625.69 |
| 2,747,611 | 5/1956 | Hewitt | 137—625.69 |
| 2,880,755 | 4/1959 | Brown. | |
| 2,989,989 | 6/1961 | Whaley et al. | 137—625.69 |
| 3,267,965 | 8/1966 | Kroffke | 137—625.64 |
| 3,327,994 | 6/1967 | Carl | 251—368 |

M. CARY NELSON, Primary Examiner

R. J. MILLER, Assistant Examiner

U.S. Cl. X.R.

137—625.69; 251—148